United States Patent [19]

Amos et al.

[11] Patent Number: 5,241,615
[45] Date of Patent: Aug. 31, 1993

[54] OPTICAL WAVEGUIDE FIBER WITH VERY THIN TITANIA-SILICA OUTER CLADDING LAYER

[75] Inventors: Lynn G. Amos; Peter C. Jones, both of Wilmington, N.C.

[73] Assignee: Corning Incorporated, Corning, N.Y.

[21] Appl. No.: 900,477

[22] Filed: Jun. 18, 1992

[51] Int. Cl.$^5$ ............................................. G02B 6/22
[52] U.S. Cl. ................................... 385/126; 385/141; 385/144
[58] Field of Search ............... 501/37, 38, 35; 65/3.1, 65/3.11, 3.12, 3.13; 385/123, 126, 127, 128, 141, 144

[56] References Cited

U.S. PATENT DOCUMENTS

| | | | |
|---|---|---|---|
| 3,849,181 | 11/1974 | Green | 428/390 |
| 4,030,901 | 6/1977 | Kaiser | 65/2 |
| 4,062,665 | 12/1977 | Izawa et al. | 65/3.12 |
| 4,125,388 | 11/1978 | Powers | 65/3.12 |
| 4,184,860 | 1/1980 | Schneider et al. | 385/123 |
| 4,224,046 | 9/1980 | Izawa et al. | 65/3.12 |
| 4,243,298 | 1/1981 | Kao et al. | 385/128 |
| 4,298,365 | 11/1981 | Bailey et al. | 65/3.12 |
| 4,367,085 | 1/1983 | Suto et al. | 65/3.12 |
| 4,486,212 | 12/1984 | Berkey | 65/3.12 |
| 4,735,826 | 4/1988 | Roba | 427/237 |
| 4,748,307 | 5/1988 | Lamb | 219/10.491 |
| 4,877,306 | 10/1989 | Kar | 385/128 |
| 4,975,102 | 12/1990 | Edahiro et al. | 65/3.12 |
| 4,988,374 | 1/1991 | Harding et al. | 65/2 |
| 5,067,975 | 11/1991 | Backer et al. | 65/3.12 |

OTHER PUBLICATIONS

McTaggart et al., "Immiscibility Area in the System $TiO_2$-$ZrO_2$-$SiO_2$", Journal of the American Ceramic Society, vol. 40, No. 5, pp. 167-170, May, 1957.

Butterman et al., "Zircon Stability and the $ZrO_2$-$SiO_2$ Phase Diagram", American Mineralogist, vol. 52, pp. 880-885, May-Jun., 1967.

Oh et al. "Increased Durability of Optical Fiber Through the Use of Compressive Cladding", Optics Letters, vol. 7, No. 5, pp. 241-243, May 1982.

Primary Examiner—Brian Healy
Assistant Examiner—John Ngo
Attorney, Agent, or Firm—Bruce E. Kamerer; K. McNeill Taylor, Jr.

[57] ABSTRACT

An optical waveguide fiber with a core region 1 and a cladding region 2, wherein the cladding region 2 includes an outer cladding region 3 is disclosed wherein the outer cladding region 3 is a very thin (less than 1 μm in thickness) layer of $TiO_2$-$SiO_2$ glass which results in a substantial reduction in the number of fiber breaks resulting from the fiber drawing process and having a predetermined $TiO_2$ concentration less than or equal to about 10 wt. %. A method for making the fiber is also disclosed.

5 Claims, 1 Drawing Sheet

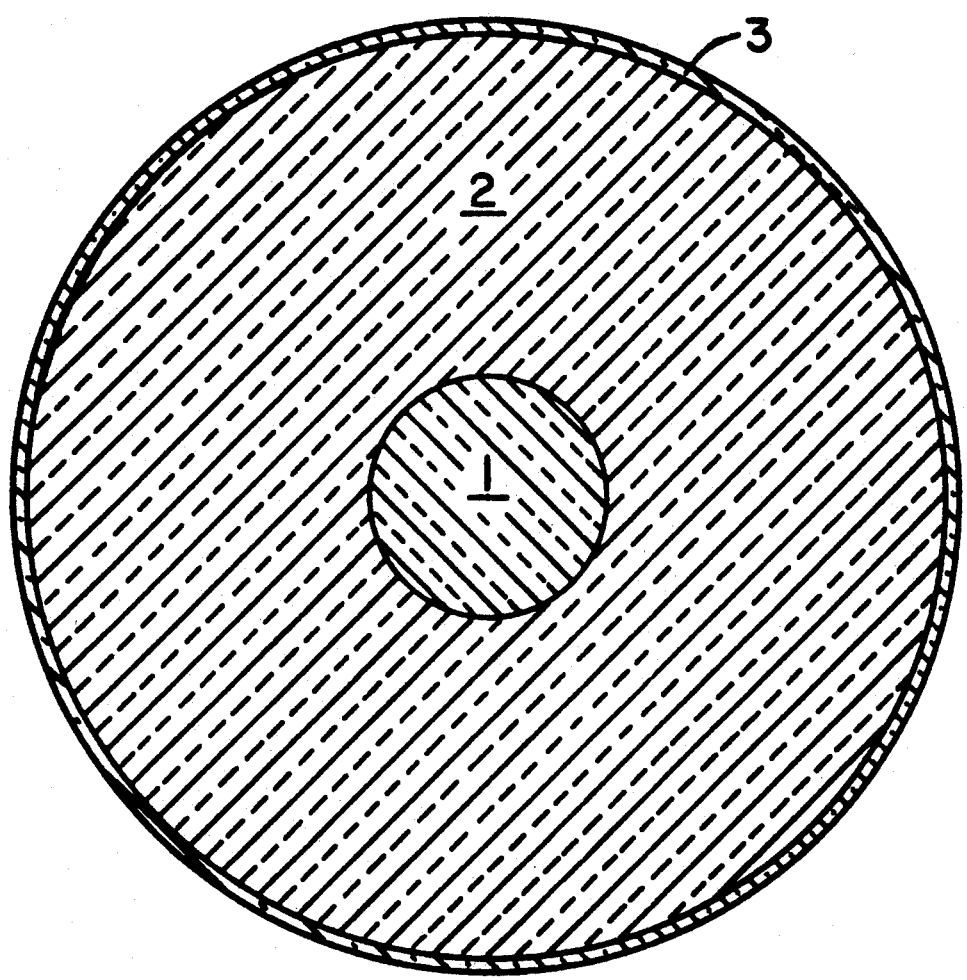

OPTICAL WAVEGUIDE FIBER WITH VERY THIN TITANIA-SILICA OUTER CLADDING LAYER

BACKGROUND OF THE INVENTION

This invention relates to a method for making an optical waveguide fiber with a thin $TiO_2$-$SiO_2$ outer cladding layer which provides a substantial reduction in the number of fiber breaks resulting from draw furnace refractory particles which occur during the post-draw strength screening step while maintaining acceptable spliceability and cleavability, and the optical waveguide fiber made thereby.

Draw furnaces used in the manufacture of optical waveguide fibers are typically constructed with a muffle made of zirconia. The glass blank from which optical waveguide fiber is drawn is exposed to the inner surface of this muffle. See, for example, Kaiser U.S. Pat. No. 4,030,901. Refractory particles are formed by spalling micron sized particles from the muffle. These refractory particles are the result of imperfections in the surface of the muffle material due to the manufacture of the muffle material and/or cracks in the muffle material formed during use.

Other methods have been used to reduce the break rate due to draw refractory particles. Roba U.S. Pat. No. 4,735,826 discloses the use of a silica coating on the inner surface of the draw furnace muffle to suppress the formation of zirconia particles from the muffle. Lamb U.S. Pat. No. 4,748,307 discloses the use of a laser beam to fuse the inner surface of a zirconia muffle to suppress the formation of zirconia particles. Both of these methods require additional expense and handling of the muffle material during manufacture.

Harding et al. U.S. Pat. No. 4,988,374 discloses an optical fiber draw furnace with a removable insert. Contaminants produced during the drawing process are deposited on the insert. The contaminants are then removed from the insert when the fiber drawing operation is complete for a given preform. The insert of Harding et al. adds complexity to the draw furnace and its operation.

It is known in the art that the addition of a $TiO_2$-$SiO_2$ outer cladding layer to an optical waveguide fiber produces beneficial results. A primary focus of this prior work has been increasing the fatigue resistance of the resulting optical waveguide fiber. Much of this work has concentrated on the use of $TiO_2$-$SiO_2$ outer cladding layers of relatively high thickness with the minimum thickness of said layers being about 1 μm. For example, Kao et al. U.S. Pat. No. 4,243,298 discloses the use of 1-10 μm thick $TiO_2$-$SiO_2$ layers with a preferred range of 1-5 μm. Kar U.S. Pat. No. 4,877,306 discloses $TiO_2$-$SiO_2$ outer cladding layers about 2-3 μm thick. Others have identified the range of 2-5 μm. See, e.g., Edahiro et al. U.S. Pat. No. 4,975,102; and Oh et al. "Increased Durability of Optical Fiber Through the Use of Compressive Cladding", Optics Letters, vol. 7, no. 5, pp. 241-3, May 1982. Backer et al. U.S. Pat. No. 5,067,975 expressly disclosed the use of $TiO_2$-$SiO_2$ outer cladding layers in the range of about 1-3 μm in thickness, although Backer et al. may be read to suggest the possibility of layers less than 1 μm thick (see below).

Backer et al. U.S. Pat. No. 5,067,975 discloses a calculated relationship between proof stress and crack depth for cracks in a range between 0.07 μm and 2.5 μm in depth. (see Backer et al., Table I, col. 19). This can be extrapolated to $TiO_2$-$SiO_2$ outer cladding layer thicknesses of less than 1 μm, considering the relationship between crack depth and layer thicknesses and taking into account the likely rate of crack growth over the service life of the fiber. Additionally, copending Backer et al. U.S. patent application Ser. No. 07/456,140, filed Dec. 22, 1989 now U.S. Pat. No. 5,140,665 and entitled "Optical Waveguide Fiber with Titania-Silica Outer Cladding" (referred hereinafter as "Backer et al. 2"), claims an optical waveguide fiber with a $TiO_2$-$SiO_2$ outer cladding layer including an outermost cladding layer with thicknesses of less than 2 μm and further claims outermost cladding layer thicknesses of less than 1 μm. (Backer et al. 2, claims 1 and 5). The specification of Backer et al. 2 is substantially identical to that of Backer et al., but Backer et al. 2 is directed to a product whereas Backer et al. is directed to a process.

Backer et al. and Backer et al. 2 may be read to suggest $TiO_2$-$SiO_2$ outer cladding layers with thicknesses less than 1 μm, while the other prior art requires thicknesses greater than or equal to 1 μm. However, both Backer et al. and Backer et al. 2 are limited to $TiO_2$-$SiO_2$ outer cladding layers having $TiO_2$ concentrations greater than 10.5 wt. %. Backer et al. and Backer et al. 2 actually teach away from thinner $TiO_2$-$SiO_2$ outer cladding layers with $TiO_2$ concentrations below 10.5 wt. % for fatigue resistance improvement as they disclose that "thin, *higher* concentration outermost layers" provide numerous advantages" such as: reduction of processing problems; compensation for diffusion of $TiO_2$ during dehydration/consolidation; the formation of more anatase crystals and fines; and higher fatigue resistance when compared to lower $TiO_2$ concentrations. (Backer et al. col. 16, line 54–col. 17, line 6) (emphasis added). This suggests a $TiO_2$ concentration higher than 10.5 wt. % as the layer thickness is reduced.

Backer et al. and Backer et al. 2 disclose one example where the thickness of the entire $TiO_2$-$SiO_2$ outer cladding layer is about 1.0 to 1.2 μm with $TiO_2$ concentration between about 15.8 and 17.4 wt. %. (Backer et al., col. 23, line 60–col. 24, line 7). Backer et al. and Backer et al. 2 also disclose a two-layer construction of a $TiO_2$-$SiO_2$ outer cladding layer, where the outermost layer is less than 1 μm thick and the $TiO_2$ concentration is in the range of about 11-17.5 wt. %. (Backer et al., col. 15, lines 12-33). Thus, it is $TiO_2$ concentrations greater than 10.5 wt. % in Backer et al. and Backer et al. 2 which form the basis for the suggestion of thicknesses less than 1 μm.

While the focus of much of the earlier work on $TiO_2$-$SiO_2$ outer cladding layers was the fatigue resistance of the resulting fiber, some notice has been taken of the impact on breaks performance. Kar U.S. Pat. No. 4,877,306 discloses $TiO_2$-$SiO_2$ outer cladding layers from about 2-3 μm thick and noted a break performance improvement of about one-third over fibers without the $TiO_2$-$SiO_2$ outer cladding layer. Backer et al. U.S. Pat. No. 5,067,975 noted that, for $TiO_2$-$SiO_2$ outer cladding layers in the range of about 1-3 μm in thickness and having $TiO_2$ concentrations greater than 10.5 wt. %, there was a significant reduction in breaks due to extrinsic flaws. The reason suggested for this improvement was the reduction in draw furnace particle inclusions for fibers with a $TiO_2$-$SiO_2$ outer cladding layer. Neither of these two references disclose or suggest a break performance improvement for $TiO_2$-$SiO_2$ outer cladding layer thicknesses less than 1 μm and having $TiO_2$ concentrations less than 10 wt. %.

Very thin coatings have been used in manufacturing polycrystalline refractory oxide fibers. Green U.S. Pat. No. 3,849,181 discloses the use of thin (between about 0.01 μm and 1 μm in thickness) coatings of at least 50 wt. % silica glass to increase the intrinsic strength of polycrystalline refractory oxide fibers. The remainder of the coating in Green could consist of materials such as oxides of beryllium, boron, germanium, lead, phosphorus, titanium, or zinc (Green, Col. 3, lines 8–16 and lines 21–29). A more preferred coating composition for the polycrystalline refractory oxide fibers would provide a vitrified coating which is essentially all silica (Green, Col. 3, lines 44–47). These thin coatings are applied to the polycrystalline refractory oxide fibers after the fiber is formed by passing the uncoated fiber through a bath containing a solution or dispersion of the glass-forming materials. The coated fiber is then heated to form the glass coating. This work was directed at "healing" surface defects in polycrystalline refractory oxide fibers. Green does not disclose or suggest the protection of fibers from failure resulting from extrinsic particles.

Some problems arise as a result of the use of $TiO_2$-$SiO_2$ outer cladding layers with higher $TiO_2$ concentrations or thicker $TiO_2$-$SiO_2$ outer cladding layers. If the $TiO_2$ concentration is too high, the resultant fiber is difficult to cleave. Also, as the $TiO_2$ concentration in the outer cladding layer increases, the migration of $TiO_2$ toward the center of the fiber increases. This migration of $TiO_2$ toward the center of the fiber can cause difficulty when splicing two pieces of such fiber together as the $TiO_2$ which has migrated toward the center may cause the splice alignment instrument to mistakenly identify the core of the fiber. Splicing difficulty also arises when using thicker $TiO_2$-$SiO_2$ outer cladding layers, as the splice alignment instrument may mistake the thicker $TiO_2$-$SiO_2$ outer cladding layer as the fiber core. This problem is particularly noticeable in the case of singlemode optical waveguide fibers where the core diameter is in the range of 6–10 μm. To correct this problem, the $TiO_2$-$SiO_2$ outer cladding layer must be substantially optically transparent so that the splice alignment instrument does not confuse the $TiO_2$-$SiO_2$ outer cladding layer as the fiber core. Substantially optically transparent means that the $TiO_2$-$SiO_2$ outer cladding layer of a fiber does not significantly interfere with the fiber alignment mechanism of a splicing instrument.

It is an object of this invention to provide an optical waveguide fiber and a method for its manufacture, whereby said fiber has a $TiO_2$-$SiO_2$ outer cladding layer which is sufficiently thick and contains a sufficient concentration of $TiO_2$ to substantially reduce the number of breaks resulting from the fiber drawing process, while being sufficiently thin and containing a concentration of $TiO_2$ which is low enough to avoid problems in cleaving and splicing said fiber.

SUMMARY OF THE INVENTION

Our invention resides in a method for manufacturing an optical waveguide fiber with a significant improvement in breaks performance while minimizing deleterious effects on cleaving and splicing the resulting fiber, and the fiber resulting therefrom.

In accordance with one aspect of our invention, a method is provided for manufacturing an optical waveguide fiber including depositing glass soot in the form of a preform which has an outer cladding layer of $TiO_2$-$SiO_2$ such that a fiber drawn therefrom would have a $TiO_2$-$SiO_2$ outer cladding layer less than 1 μm in thickness, consolidating said preform to form a glass blank, and drawing said glass blank into an optical waveguide fiber with a $TiO_2$-$SiO_2$ outer cladding layer less than 1 μm in thickness and having a $TiO_2$ concentration less than or equal to about 10 wt. %.

Another aspect of our invention relates to an optical waveguide fiber with a $TiO_2$-$SiO_2$ outer cladding layer which is sufficiently thick and contains a sufficient concentration of $TiO_2$ to substantially reduce the number of breaks resulting from the fiber drawing process, with the thickness of the $TiO_2$-$SiO_2$ outer cladding layer being than 1 μm and having a $TiO_2$ concentration less than or equal to about 10 wt. %.

BRIEF DESCRIPTION OF THE DRAWINGS

FIG. 1 is a cross-sectional view of a fiber made in accordance with the invention. This drawing is not drawn to scale and is not intended to indicate the relative sizes of the different portions of the fiber.

DETAILED DESCRIPTION

FIG. 1 shows a cross-sectional view of a fiber made in accordance with the present invention. The fiber consists of a core region 1, a cladding region 2, and an outer cladding layer 3. The core region 1 and cladding region 2 are composed of materials with an appropriate refractive index differential to provide the desired optical characteristics. The cladding region 2 includes all glass portions of a fiber outside the core region 1 and is not limited to glass portions of the fiber outside of the core region 1 which are optically functional. The outer cladding layer 3 is composed of $TiO_2$-$SiO_2$. A preform containing the materials for the core region 1, the cladding region 2, and the outer cladding layer 3 can be produced using many techniques known in the art including OVD and VAD. For OVD, see, for example, Powers U.S. Pat. No. 4,125,388; Bailey et al. U.S. Pat. No. 4,298,365; Berkey U.S. Pat. No. 4,486,212; and Backer et al. U.S. Pat. No. 5,067,975. For VAD, see, for example, Izawa et al. U.S. Pat. No. 4,062,665; Izawa et al. U.S. Pat. No. 4,224,046; and Suto et al. U.S. Pat. No. 4,367,085. The resulting preform is then consolidated into a glass blank. The glass blank is then drawn into a fiber with a $TiO_2$-$SiO_2$ outer cladding layer of less than 1 μm in thickness.

The mechanisms for defects caused by draw furnace refractory particles which lead to the failure of fiber in proof testing are not fully understood. To generate a defect, the particle: i) is formed; ii) is transported to the blank surface; iii) adheres to the blank surface; and, iv) is partially submerged into the fiber surface as the fiber is formed. Since draw furnaces are typically constructed with a muffle made of zirconia draw furnace refractory particles typically consist of zirconia.

It is likely that the rate of formation of zirconia particles is not affected by the composition of the blank being processed. The rate of formation of zirconia particles is primarily a function of the condition of the inner surface of the draw refractory material. For example, the presence of cracks in the inner surface of the draw refractory material increases the number of draw refractory particles in the fiber forming area. Also, routine manufacturing practices, such as loading relatively cool preforms into a heated draw furnace, ramping the draw to operating speed, and adjusting the draw furnace temperature, produce thermal gradients which tend to spall zirconia particles from the brittle refractory material.

It is also likely that the adherence of zirconia particles for titania-silica blanks as compared to the adherence of zirconia particles for silica blanks is substantially similar.

We believe that the present invention affects primarily the second and fourth events—transport and submergence/dissolution—in the above chain.

We believe the zirconia particles are not transported to the surface of the blank as easily if titania is present in the outer cladding layer of the blank. There are temperature differences in the fiber forming regions of blanks with titania in the outer cladding layer as compared to blanks without titania in the outer cladding layer. These thermal differences are the result of thermal property differences due to differences in the IR absorption and thermal conductivity as a function of glass composition. We postulate that these temperature differences in the fiber forming regions appear to be sufficient to create substantial differences in thermophoretic transport.

The enhanced submergence and dissolution of draw furnace refractory particles in blanks with titania in the outer cladding layer appears to be a decisive factor. We believe the submergence and dissolution of draw furnace refractory particles in a blank with a $TiO_2$-$SiO_2$ outer cladding layer proceeds at a higher rate than in a blank with only $SiO_2$ in the outer cladding layer.

The rate of dissolution is highly temperature dependent. The diffusion rate is increased as temperature increases. Also, an all liquid state will exist at a much lower temperature—about 1850° C.—for the $ZrO_2$-$TiO_2$-$SiO_2$ trinary system as compared to about 2250° C. for the $ZrO_2$-$SiO_2$ binary system. This suggests that a higher rate of dissolution is possible in blanks with $TiO_2$ in the outer cladding layer since an all liquid state would exist at temperatures which are much lower that the temperature required for an all liquid state in blanks with only $SiO_2$ in the outer cladding layer. For additional information on the $ZrO_2$-$TiO_2$-$SiO_2$ and $ZrO_2$-$SiO_2$ systems, see McTaggart et al., "Immiscibility Area in the System $TiO_2$-$ZrO_2$-$SiO_2$", Journal of the American Ceramic Society, Vol. 40, No. 5, pp. 167-70, May, 1957; and Butterman et al., "Zircon Stability and the $ZrO_2$-$SiO_2$ Phase Diagram", American Mineralogist, Vol. 52, pp. 880-885, May-June, 1967.

There is also a possibility that the presence of $TiO_2$ in the outer cladding layer improves the rate of submergence of surface $ZrO_2$ particles. Any improvement in the rate of submergence could be due to the presence of an all liquid state at much lower temperatures for blanks with $TiO_2$ in the outer cladding layer as compared to blanks with only $SiO_2$ in the outer cladding layer.

The economic impact of our invention lies primarily in reducing the number of draw furnace rebuilds required in order to avoid an excessive number of fiber breaks resulting from draw furnace refractory particles. During the useful life of a draw furnace, cracks develop in the refractory material. These cracks increase the number of draw furnace refractory particles present in the fiber forming area of the draw furnace. At present, the primary method for reducing breaks caused by draw refractory particles is to replace the refractory material during a draw furnace rebuild, which results in the generation of fewer draw furnace particles. A blank made with a thin layer of titania-silica glass in the outer cladding layer can be exposed to more draw furnace refractory particles without producing excessive fiber breaks. By using a blank with a thin layer of titania-silica glass in the outer cladding layer, the number and frequency of these draw furnace rebuilds can be substantially reduced. Fewer draw furnace rebuilds reduce the costs of manufacturing optical waveguide fibers by reducing equipment costs and draw furnace down time.

We have also found surprising benefits in the heating requirements when drawing preforms made with $TiO_2$-$SiO_2$ outer cladding layers. Preforms with $TiO_2$-$SiO_2$ outer cladding layers are opaque in appearance while preforms without $TiO_2$-$SiO_2$ outer cladding layers are essentially transparent except for a small portion at the top end of the preform. We believe that a transparent preform conducts a significant amount of the radiant energy from the hot zone of the draw furnace up to the top of the preform. When this radiant energy reaches the top of the blank which is opaque and is outside the insulated portion of the furnace during most of the draw operation, the radiant energy is dispersed into the atmosphere surrounding the draw furnace. Preforms with $TiO_2$-$SiO_2$ outer cladding layers do not conduct the radiant energy away from the hot zone of the furnace since these preforms are opaque throughout the length of the preform. Therefore, we believe that any radiant energy which is transmitted along the length of a preform with $TiO_2$-$SiO_2$ outer cladding layers will be dispersed into the draw furnace, thereby requiring less power to maintain a given furnace temperature as compared to preforms without $TiO_2$-$SiO_2$ outer cladding layers. Also, the dispersal of radiant energy within the insulated portion of the draw furnace results in a higher temperature for a given power level. This higher temperature may result in either higher rates of submergence and dissolution of zirconia particles into the preform or substantial differences in thermophoretic transport of zirconia particles to the fiber forming regions of the preform during the drawing process.

In one example of this invention, three optical waveguide blanks were made using standard Outside Vapor Deposition techniques (see Powers U.S. Pat. No. 4,125,388; Bailey et al. U.S. Pat. No. 4,298,365; and Berkey U.S. Pat. No. 4,486,212), with one exception. During the soot laydown process, two passes of soot were applied which contained sufficient $TiO_2$ to create fibers with a 0.2 $\mu$m, 8-10 wt. % $TiO_2$ outer cladding layer. These blanks were consolidated in a manner as described in Backer et al. U.S. Pat. No. 5,067,975.

The consolidated blank was drawn into fiber with a total diameter of 125 $\mu$m and proof tested at 100 kpsi. Only one break occurred during proof testing of the fiber from the three blanks. It was determined that the single break was a bending-type break and was not caused by draw furnace refractory particles. The previous twenty-two silica-only outer cladding layer blanks run through the same draw furnace had a break rate at proof testing of about 8.4 breaks per blank. Break source analysis revealed that the majority of these breaks were caused by draw furnace refractory particles.

In another example of this invention, two more blanks were made as described above. The $TiO_2$-$SiO_2$ outer cladding layer of the resulting fiber was about 0.2 $\mu$m in thickness and contained about 10 wt. % $TiO_2$. We believe that this is near the lower end of the range for thickness of the $TiO_2$-$SiO_2$ outer cladding layer to provide sufficient $TiO_2$ around the circumference of the outer cladding layer to result in a substantial reduction in the breaks caused by draw furnace refractory particles. The TiO$_2$-SiO$_2$ outer cladding layer might be further reduced to a thickness of 0.1 μm or 0.05 μm in accordance with the present invention provided that the manufacture of such layers is practicable and consistent.

These two blanks were loaded into a draw furnace cold to maximize the potential for breaks due to draw furnace refractory particles. The fiber drawn from this blank was proof tested at 100 kpsi. One break occurred during proof testing of the fiber drawn from these blanks. The source of this break could not be determined. Two control blanks without the TiO$_2$-SiO$_2$ outer cladding layer were drawn in the same draw furnace. Five breaks occurred during proof testing of the fiber drawn from these control blanks (2.5 breaks per blank). All five breaks were caused by draw furnace refractory particles.

In another example of this invention, six optical waveguide blanks were made as described above. The thickness and the wt. % TiO$_2$ of the fiber drawn from these blanks were as shown in Table I. Two blanks were made for each case.

TABLE I

Thickness, Titania Concentration and Breaks per Blank

| Case | Thickness (μm) | Titania (wt. %) |
|---|---|---|
| 1 | 0.2 | 3.0 |
| 2 | 0.2 | 4.0 |
| 3 | 1.0 | 8.0 |

These fibers were proof tested at 100 kpsi. Fibers from the two blanks with TiO$_2$-SiO$_2$ outer layers of 1.0 μm thickness and 8 wt. % exhibited no zirconia-related breaks. One blank from case 1 (0.2 μm thickness, 3.0 wt. %) and one blank from case 2 (0.2 μm thickness, 4.0 wt. %) exhibited at least one zirconia-related break. 89 blanks without TiO$_2$-SiO$_2$ outer layers were drawn about the same time as these six blanks and exhibited an average break rate of about 4 breaks per blank. Break source analysis was not performed on the blanks without TiO$_2$-SiO$_2$ outer layers, but typically, more than half of the breaks would be expected to be caused by zirconia particles.

Tests were run on fibers with varying thicknesses of the TiO$_2$-SiO$_2$ outer cladding layer and varying TiO$_2$ concentrations to determine the relative impact of TiO$_2$-SiO$_2$ outer cladding layer thickness and TiO$_2$ concentration on the cleaving and splicing of optical fibers with TiO$_2$-SiO$_2$ outer cladding layers. The results of these experiments indicated that end face quality, a measure of cleavability, was better for fibers with thinner TiO$_2$-SiO$_2$ outer cladding layers than for fibers with thicker TiO$_2$-SiO$_2$ outer cladding layers. Also, the end face quality was better for fibers with lower TiO$_2$ concentrations than for fibers with higher TiO$_2$ concentrations. Post scribe strength, another measure of cleavability, produced similar results with lower thicknesses and lower concentrations being better than higher thicknesses and higher concentrations. Finally, the splice loss was measured for fibers made during this experiment. Splice loss may be due to several factors, including operator influences as well as misalignment of the fibers caused by the splice alignment instrument mistakenly identifying a TiO$_2$-SiO$_2$ outer cladding layer as the core of the fiber. Keeping this in mind, the results indicated that the splice loss increased with the thickness of the TiO$_2$-SiO$_2$ outer cladding layer. The concentration of TiO$_2$ in the outer cladding layer interacted with the thickness to cause higher splice loss at higher concentrations and thicknesses.

These tests clearly show that TiO$_2$-SiO$_2$ outer cladding layer thicknesses of less than 1.0 μm have better cleaving and splicing characteristics than TiO$_2$-SiO$_2$ outer cladding layer thicknesses above 2.0 μm. Similarly, these tests show that TiO$_2$ concentrations of less than or equal to 10 wt. % have better cleaving and splicing characteristics than concentrations above about 10 wt. %.

Our invention may also be implemented by applying a layer of TiO$_2$-SiO$_2$ soot of appropriate thickness and TiO$_2$ concentration to a consolidated optical waveguide preform. The TiO$_2$-SiO$_2$ soot layer is then consolidated. The consolidated preform with the TiO$_2$-SiO$_2$ outer layer is then drawn into optical waveguide fiber with the properties described herein.

The present invention has been particularly shown and described with reference to preferred embodiments thereof, however, it will be understood by those skilled in the art that various changes may be made in the form and details of these embodiments without departing from the true spirit and scope of the invention as defined by the following claims.

We claim:

1. An optical waveguide fiber comprising
    a. a core region, and
    b. a cladding region,
    wherein said cladding region includes an outer cladding layer of TiO$_2$-SiO$_2$ glass, said fiber being characterized in that the thickness of said outer cladding layer of TiO$_2$-SiO$_2$ glass is less than 1 μm and the concentration of TiO$_2$ in said outer cladding layer is less than or equal to about 10 wt. % TiO$_2$.

2. An optical waveguide fiber in accordance with claim 1 wherein said outer cladding layer of TiO$_2$-SiO$_2$ glass is of sufficient thickness to substantially reduce losses during fiber strength testing caused by draw furnace refractory particles.

3. An optical waveguide fiber in accordance with claim 1 wherein said outer cladding layer of TiO$_2$-SiO$_2$ glass has a thickness and a concentration of TiO$_2$ such that the cleavability and spliceability of said fiber is not unacceptably affected.

4. An optical waveguide fiber in accordance with claim 1 wherein the thickness of said outer cladding layer of TiO$_2$-SiO$_2$ glass is between about 0.05 μm and about 1.0 μm.

5. An optical waveguide fiber in accordance with claim 4 wherein the thickness of said outer cladding layer of TiO$_2$-SiO$_2$ glass is about 0.2 μm.

* * * * *